United States Patent Office 3,595,681
Patented July 27, 1971

3,595,681
MICROBIAL STABILIZATION PROCESS FOR PRODUCE AND PRODUCT
Milton Kaplow, White Plains, and Joseph Halik, Yonkers, N.Y., assignors to General Foods Corporation, White Plains, N.Y.
No Drawing. Filed Nov. 22, 1967, Ser. No. 684,952
Int. Cl. A23b 7/02, 1/04
U.S. Cl. 99—199
11 Claims

ABSTRACT OF THE DISCLOSURE

Microbial stabilization of produce is effected by the infusion of dehydrated produce having a moisture content of less than 20% with an aqueous polyhydric alcohol solution whereby the moisture level of the produce is increased to 20-40% and the polyhydric alcohol is caused to be present therein at a level of at least 5% of the total water soluble compounds present.

---

This invention relates to processes for the provision of semi-moist stabilized foodstuffs, typically meat, vegetables, and fruits which are normally prone to undergo bacterial and other microorganic decomposition. More particularly the invention is concerned with the infusion of the aforesaid class of foodstuffs with stabilizing solutes so as to edify the foodstuffs with improved organoleptic properties.

Fresh and cooked meat, vegetables and fruit at a moisture level in the neighborhood of 50% and higher, depending upon the character of the produce, are prone to undergo microorganic decomposition. Preservation of such produce by dehydration has been the subject of intensive and widespread investigation, particularly during wartime, and has been responsible for the stimulation of the art to its present high order of development. But whereas meats and vegetables typified by chicken and carrots rehydrate readily from say a dried state of less than 20% moisture, it would be desirable to have such food items in a semi-moist form such that they can be eaten "as is," simply warmed or if desired, moistened further for consumption and yet are "shelf stable," i.e., require no refrigeration or even commercial sterilization preparatory to packaging. Unfortunately the edibility of meats and vegetables such as carrots and chicken in the 20–25% moisture range is unacceptable as the items are tough and dry to the taste and also subject to microbial decomposition anaerobic packaging conditions, i.e., cold-packing.

In the case of meat, it would be desirable to avoid dehydration of same to say a moisture content less than 15% due to the changes that take place during storage of the meat and as a result of dehydration. Dehydrated meat will be less rehydratable than might be desired in many food applications, particularly those wherein the meat is contemporaneously rehydrated with other material such as dehydrated vegetables. It would be desirable to have essentially a shelf stable meat preparation requiring no refrigerated storage which has a "moist" texture such that it can be eaten as is, warmed or further hydrated and which approaches conventionally cooked meat in eating quality. Prior art workers have suggested that meat can be preserved by dehydration to say a moisture content of less than 40% and the curing of meat by such curing agents as sugar and salt is traditional. However, in many preservation treatments such curing is erratic and in some instances dependent upon the skill of the processor; in most such applications the food is characteristically tough and dry and excessively salty.

One aspect of the present invention calls for removal of at least a major percent by weight of the moisture present in the meat by lyophilization whereafter the meat is infused with a stabilizing solution which serves to increase the moisture content of the meat and incorporate into the meat a functional stabilizing solute, principal of which will be a polyhydric alcohol such as glycerol. Thus in a practical embodiment of the invention pre-cooked meat and meat by-products, as that term is commonly understood in the art, will be freeze-dried under conditions whereby the moisture content of the meat or meat by-product will be reduced to less than 20% thereby leaving the meat tissue in a form whereby it will admit stabilizing solutes. After such desiccation the meat is immersed in a stabilizing aqueous solution having a substantial amount of polyhydric alcohol together with optional other stabilizing solutes such as sugars and/or salts whereby the material will be infused by such agents and will have a moisture content ranging anywhere from 20 to 40%.

In general the stabilizing solution will have a high concentration of solutes typically but not necessarily in excess of the ultimate weight of moisture intended to be present in the thus stabilized meaty material. It will be preferable in accordance with the present invention that the polyhydric alcohol such as glycerol be present at a level in the stabilizing solution used to treat the meaty material in excess of 10% of the total water soluble compounds in the stabilizing solution. The meat should be so dried that case hardening of the meat tissue is avoided. Usually this will be done after the meat has been at least pasteurized to an essentially pathogen-free condition and preferably after the meat is fully cooked either by roasting, boiling or otherwise; in this way the stabilized meat product can be consumed "as is." However, in its broadest sense the invention is applicable to preservation of fresh, though essentially pathogen-free animal tissue as well, in which case the stabilized product will be further treated or cooked as consumption may dictate.

By subliming the water vapor present in the meat prior to infusion, its morphology is such that when a stabilizing solution containing the polyhydric alcohol is employed as by immersing the meat therein, the solution will infuse the matrix of the meat effectively and uniformly in a comparatively short period of time. In this way, treatment in the stabilizing solution will not be unduly prolonged such that the meat will not unduly lose any of its desired character prematurely due to treatment by the stabilizing solute. Should the thus stabilized meat be further hydrated preparatory to consumption or incident to any further cooking, the cell structure of the meat is such that it will admit water readily and have a desired eating quality, although it is contemplated that the most advantageous applications will call for consumption of the meat "as is."

Various polyhydric alcohols of use in the intermediate moisture meat, vegetable and fruit products processed by the invention will be found effective not only as stabilizing solutes but importantly also in simulating product moistness and lubricity for enhancing eating quality, glycerol being the most preferred; other preferred polyhydric alcohols are sorbitol, mannitol and mixtures thereof. For meat products, fat infused with the stabilizing solution has also been found to be an important additive in complementing the desired textural and flavor qualities provided by the polyhydric alcohol; salt and sugar, when compatible with flavor, are also useful additives as infusing solutes. Antimycotics will generally be part of the stabilizing solution when the produce is to be aerobically packed, i.e., cold packed; propylene glycol has been useful both as a polyhydric alcohol and as an antimycotic infusion solute although propylene glycol will usually be preferably employed together with a sorbic acid compound such as potassium sorbate and at a comparatively low level in the stabilizing solution due to adverse taste, say between 1 and 5% for propylene glycol and 0.1 and 1.0% for the sorbic acid compound.

Illustrative of embodiments of the present invention as applied to meat preservation are poultry parts such as diced cooked chicken meat containing 62% moisture (white meat without skin) which has preferably been freeze dried to a moisture content of less than 5% and more commonly 2% to 3% and thereafter immersed in a stabilizing solution containing at least 5% and preferably a major weight percent of glycerol or other suitable polyhydric alcohol until such time as the poultry part has a moisture content of 20 to 25%, although meat at higher hydrated moisture contents up to 40% may be similarly practiced. The infusion will be caused to proceed under conditions which result in a high level of water soluble compounds typically in excess of the weight level of the total product moisture. Such a stabilized meat material can be readily packaged under aerobic handling and packaging conditions, that is, it may be cold packed at temperatures less than commercial sterilization temperatures and stored either in hermetic or non-hermetic packaging materials, whereafter the so-packaged meat may be consumed as such, warmed or further "moistened" simply by immersion in hot or cold water as desired; upon such immersion the meat will hydrate to a moisture content in excess of 50%. Most advantageously when eaten as is, the softening and texturizing polyhydric alcohol, typical member of which is glycerol, will render the produce moist to the taste whether eaten warm or cold. Besides poultry, beef, pork and fish may be similarly preserved as will be apparent from the accompanying operative examples of preserved meats.

EXAMPLE 1

Diced chicken pieces

Fresh chicken (72% moisture) white meat without skin was cooked to an edible condition (62% moisture).

The precooked chicken was cut in ½–1″ pieces and freeze dried for 20 hours. To freeze dry, the pieces were quick frozen on Dry Ice (solid carbon dioxide) and inserted into a Stokes vacuum freeze dryer having a chamber temperature of minus 8° F. and a shelf heat temperature of about 115° F. for 20 hours. The freeze dried product had approximately 1–2% moisture.

The freeze dried meat was then immersed in an infusing solution having the following formulation:

| | Percent | |
|---|---|---|
| | Solution | Final prod. |
| Freeze dried chicken solids | | 34.3 |
| Glycerol | 49.2 | 32.4 |
| Water | 42.5 | 27.8 |
| Chicken soup base [1] | 6.2 | 4.1 |
| Propylene glycol | 1.6 | 1.1 |
| Potassium sorbate | .5 | .3 |
| Total | 100.0 | 100.0 |

[1] 6 parts salt, 11 parts sugar, 13 parts mono-sodium glutamate, and flavor and spices.

Weight percentage of solution infused was (65.7) which approaches closely the weight percentage of original water content of the chicken prior to freeze drying. Lesser amounts of liquid can be infused (partial infusion) by raising the soaking ratio of freeze-dried chicken to solution and reducing the infusion time. The infused chicken product is essentially shelf stable. It can be packed without refrigeration and stored indefinitely in reopenable jars. When eaten "as is" the chicken is moist, tender and of acceptable flavor and appearance. The product can be further hydrated in water or a soup for other recipe applications.

In the case of fruits and vegetables, it is likewise desirable to provide a produce which is edible as such while at the same time being stabilized against microorganic decomposition such that it may either be aerobically or anaerobically packed, ideally aerobically packed under ambient non-sterile, non-aseptic conditions. Most fruits and vegetables when packed under such conditions must be dehydrated to a moisture content below 20% and commonly to less than 10% in the case of vegetables low in sugars. At such low moisture content these fruits and vegetables develop undesirable flavors—such as hay flavor and the like—and when rehydrated they are less than desirably soft despite the duration of the treatment that may be employed to infuse them with moisture.

In accordance with the present process, therefore, dehydrated fruits and vegetables, i.e., material which has been desiccated to a moisture content of less than 20% and commonly to the neighborhood of 3 to 7% in the case of most vegetables by such means as freeze drying, puff drying or vacuum drying are rehydrated partially by the use of a stabilizing solution having one of the aforesaid polyhydric alcohol class members present in a concentration of at least 5% of the total water soluble stabilizing solutes and having a high (major percent by weight) concentration of solutes such that the treated fruit and vegetable has a moisture content ranging from 20 to 40% and a concentration of solutes therein sufficiently high as in the case of meat to provide bacteriostasis as well as protection against the development of yeast and molds, which latter development may likewise be further prevented usually by the inclusion of an antimycotic. The use of the polyhydric alcohol such as glycerol to infuse the previously dehydrated fruit or vegetable permits the product to be stabilized against microorganic decomposition while at the same time providing the product with a satisfying organoleptic moistness, plasticity and softness for a product which is to be eaten "as is" or with only limited further hydration.

The level of solutes to effect stabilizations by infusing the matrix of fruits and vegetables will, as in the case of meat, be at least equal to the intended level of moisture in the rehydrated product and generally will comprise together with the polyhydric alcohol to be overtly infused at least a major weight percent of the stabilizing solution used during such treatment, thereby supplementing the level of solutes that naturally occur in the produce so treated.

As distinguished from meats, fruits and vegetables may be dehydrated by air drying technique such as are customarily employed to reduce the moisture content, although vacuum freeze drying is the preferred desiccating technique. A typical and acceptable desiccating operation will call for the use of multistage through-circulation forced hot air drying or other inert drying gas at, say, 200–400° F. to cause rapid circulation of the heat transfer medium under conditions which do not give rise to elevation in product temperature above 212° F. and do not result in surface hardening of the produce, whereby plant tissue morphology is such that stabilizing solutes used will be effectively and uniformly distributed throughout the food. The extent of dehydration of the fruit or vegetable to be treated will be dependent upon the natural sugar level thereof and the dry storage conditions required preparatory to solute infusion. In the case of most fruits it will simply be necessary to dry the fruit to a moisture content less than 20%, say to 10–20%, by virtue of the presence of naturally occurring stabilizing sugars therein. On the other hand, in the case of most vegetables, it will be necessary to reduce the moisture content of the vegetable to less than 7% and generally less than 10% by reason of the absence therefrom of sufficiently high level of naturally occurring stabilizing solutes.

After such dehydration, the plant material to be treated will typically be immersed in an excess amount of solution which will contain a major percent of water soluble low molecular weight compounds and have at least 5% polyhydric alcohol therein, immersion being allowed to proceed long enough to effect a moisture increase to a product moisture of 20–40% an infusion of at least 5% polyhydric alcohol by weight of the hydrated plant material, and a total infusion of water soluble solutes at least equal to the moisture level in the treated product. The duration of plant material immersion will preferably also be long enough, say 10–15 minutes at a sufficiently elevated infusion temperature of 160° F. and higher to effect pasteurization, i.e., render the produce essentially pathogen-free and essentially commercially sterile. However, such temperature elevation is not essential to the invention inasmuch as dehydration to the aforestated moisture range, i.e., less than 20%, will usually effect requisite pasteurization.

The following are examples of processes for providing stabilized semi-moist vegetables and fruits.

EXAMPLE 2

Stabilized carrot dices

Fresh carrots were washed, peeled, diced into 6 mm. dice size. The dices were boiled till cooked, drained, rinsed in cold water and drain again. The dices were quick frozen, using Dry Ice as in Example 1 and were freeze dried as in Example 2 to 3% moisture.

The following stabilized product was prepared by soaking the freeze-dried precooked carrot dices in an excess stabilizing solution:

|  | Percent | |
|---|---|---|
|  | Solution | Final prod |
| Glycerol | 54.4 | 51.1 |
| Water | 42.0 | 39.9 |
| Freeze dried carrot solids | | 6.3 |
| NaCl | 2.2 | 2.3 |
| Propylene glycol | 1.1 | .3 |
| Potassium sorbate | .3 | .1 |
| Total | 100.0 | 100.0 |

The resulting product has good appearance and eating qualities when eaten "as is." It can be cold packed in reclosable jars as in Example 1 and retains its edibility, microorganic stability and color stability without refrigeration.

EXAMPLE 3

Stabilized semi-moist puffed dried carrots

Puff dried carrot dice ⅜″ x ⅜″ x ⅜″ were soaked for 20 hours in excess of stabilizing solution having the following formula:

| Glycerol | 54.4 |
|---|---|
| H₂O | 42.0 |
| NaCl | 2.2 |
| Propylene glycol | 1.1 |
| Potassium sorbate | .3 |

After soaking overnight and draining, 5.1 gm. of the original puff-dried dice weighed 14.9 gm. (absorbing 9.8 gm. glycerol-water solution). The infused product had the following composition:

| Ingredient: | Percent by wt. |
|---|---|
| Glycerol | 35.9 |
| Puff-dried carrot solids | 34.2 |
| H₂O | 27.5 |
| NaCl | 1.5 |
| Propylene glycol | .7 |
| Potassium sorbate | .2 |
|  | 100.0 |

The resulting infused dice had acceptable appearance, texture and flavor cold. When packaged aerobically in reopenable jars and stored therein without refrigeration carrot dice stability was comparable to that of carrot dice in Example 2.

EXAMPLE 4

Stable semi-moist apple slices

An infusing solution was prepared and blended with puff dried apple slices at the ratio of 9 parts apple and 11 parts solution and the blend was soaked under refrigeration for 24 hours. The solution infused totally into the apple. The resulting product was ready to eat as is, had acceptable texture, flavor and appearance and had good microbial storage stability when stored for one month in a reclosable jar with refrigeration.

Formulations for solution and infused apple were as follows:

|  | Percent | |
|---|---|---|
|  | Solution | Final prod. |
| Apple slices, puff dried |  | 44.97 |
| Water | 45.42 | 25.00 |
| Glycerol | 26.35 | 14.50 |
| Sucrose | 23.98 | 13.20 |
| Propylene glycol | 3.65 | 2.00 |
| Potassium sorbate | .55 | .30 |
| Sodium meta-bisulfite | .05 | .03 |
| Total | 100.00 | 100.00 |

The foregoing stabilized produce can be packaged under hot as well as cold packing conditions in either hermetic or non-hermetic packaging materials as indicated hereinabove. Thus, stabilized fruit, vegetables and meat can be cooled to below 160° F. and typically may be adjusted in temperature to ambient conditions at which temperature the produce can be mechanically handled and further treated as by shaping, subdivision, compression or the like. After such handling the produce can be packed in either hermetic packaging containers such as glass jars or tins or can be non-hermetically sealed as in flexible enwrapments like cellophane and the like. Selection of the packaging material will, to some degree, be dictated by the ultimate use requirements for the product. In many instances it will be desirable to infuse a substantial amount of moisture and in excess of 30% in the resulting plant material in order that it will exhibit softness and other good organoleptic texture qualities; in such applications the foodstuff will preferably be packaged aerobically at ambient temperatures in a substantially hermetically sealed container which may be of the polyethylene-coated aluminum foil type or like flexible packaging material. In other instances of products at say 20–30% moisture, it may not be essential to employ such comparatively expensive packaging and instead a non-hermetic package of cellophane may be used, all of which packaging techniques are within the skill of those of the art.

Although the stabilizing infusing solution of use in accordance with the present invention and the produce so treated will find most advantageous applications in the so-called cold packing arts, it is also practical and within the spirit of the invention to package the stabilized product under commercial sterilization conditions, i.e., conditions wherein the product will be packaged in a substantially spore-free atmosphere at say temperature in excess of 180° F. and in packaging materials which are substantially hermetic.

To some degree the intended packaging and storage of the produce will determine the character of the infusion with the stabilizing solution. In most applications, however, it will be found that the total level of water soluble solutes added by the infusion process of the present invention will be a major weight percent of the total water soluble solutes recoverable from the foodstuff. Thus, whereas the foodstuff may have naturally present certain salts, sugars and the like, there will be infused therein additional solutes in the form of the polyhydric alcohols as well as added sugars and/or salts in such concentration that the foodstuff will comprise a level of such solutes at least equal to the level of moisture present in the product. In some applications, particularly at the higher moisture range—say above 25% and generally between 30 and 40% it may be desirable to employ a food acidulant such as phosphoric acid or other edible acidulating agents which is functional to increase the hydrogen ion concentration in the foodstuff and thereby stabilize it to an extent such that the solutes added to the foodstuff will not constitute a major percent by weight of the moisture present in the product. Thus, in the case of some fruits which are pleasantly adapted to acidulation such as apricots, it may be desirable to add an edible organic or even an inorganic acid to the stabilizing solution in which case the level of polyhydric alcohol taken with the level of sugar and/or salts used to supplement the alcohol will be such that the total level of solutes will be less than the terminal moisture of the produce. Accordingly, the invention is not to be restricted to any particular concentration of produce solutes but rather is adaptable to a wide range of concentrations of polyhydric alcohol, sugars and salts and sugar/salt mixtures.

What is claimed is:

1. Process for stabilization of produce which comprises dehydrating by either lyophilization, hot air drying, puff drying or vacuum drying the produce to a moisture content of less than 20% and infusing the produce with an aqueous microbial stabilizing solution containing a polyhydric alcohol selected from the group consisting of glycerol, sorbitol, mannitol, propylene glycol, and mixtures thereof so as to adjust the moisture level of the produce upwardly to between 20–40% and cause the polyhydric alcohol to be present therein at a level of at least 5% by weight of the total water soluble compounds present, and packaging the microbial stabilized produce in a moisture impermeable container.

2. Process according to claim 1 wherein the produce has at least a majority of the moisture present prior to dehydration removed by lyophilization.

3. Process according to claim 2 wherein the produce is meat.

4. Process according to claim 3 wherein the meat is cooked prior to lyophilization.

5. Process according to claim 1 wherein the total level of solutes present in the produce is at least equal to the moisture level.

6. Process according to claim 1 wherein the polyhydric alcohol is glycerol.

7. Process according to claim 1 wherein the produce is a fruit which has been dehydrated to between 10 and 20% moisture.

8. Process according to claim 1 wherein the produce is a vegetable which has been dehydrated to less than 7% moisture.

9. A stabilized product selected from the group consisting of fruits, vegetables, and meats comprising products which have been dehydrated by either lyophilization, hot air drying, puff drying or vacuum drying prior to infusion with an aqueous microbial stabilizing solution containing a polyhydric alcohol selected from the group consisting of glycerol, sorbitol, mannitol, propylene glycol, and mixtures thereof, said polyhydric alcohol infused therein at a level of at least 5% by weight of the total water soluble compounds present and said microbial stabilized product having a moisture content ranging from about 20 to about 40 weight percent and packaged in a moisture impermeable container.

10. The stabilized product of claim 9 wherein the polyhydric alcohol is glycerol.

11. The invention according to claim 9 wherein the stabilized product is a cooked stabilized product.

References Cited

UNITED STATES PATENTS

| | | | |
|---|---|---|---|
| 1,853,151 | 4/1932 | Segur | 99—104 |
| 2,189,947 | 2/1940 | Griffith | 99—154 |
| 2,278,472 | 4/1942 | Musher | 99—104 |
| 2,890,120 | 6/1959 | Makower | 99—154 |
| 3,202,514 | 8/1965 | Burgess | 99—107 |
| 3,459,561 | 8/1969 | Mook | 99—157 |
| 2,420,517 | 5/1947 | Brandner | 99—204 |

NORMAN YUDKOFF, Primary Examiner

M. G. MULLEN, Assistant Examiner

U.S. Cl. X.R.

99—204, 208, 154, 157

UNITED STATES PATENT OFFICE
CERTIFICATE OF CORRECTION

Patent No. 3,595,681           Dated July 27, 1971

Inventor(s) Milton Kaplow and Joseph Halik

It is certified that error appears in the above-identified patent and that said Letters Patent are hereby corrected as shown below:

Column 1, line 21, insert the following paragraph:

---The invention herein described was made in the course of or under a contract with the U.S. Army Natick Laboratories.---

Column 1, line 48, after "and" insert --are--.

Column 5, in the column headed "Final prod" in the table for Example 2, change "39.9" to --39.3--; "2.3" to --2.1--; ".3" to --.9--; and ".1" to --.3--.

Signed and sealed this 15th day of February 1972.

(SEAL)
Attest:

EDWARD M. FLETCHER, JR.       ROBERT GOTTSCHALK
Attesting Officer               Commissioner of Patents